United States Patent
Tabuchi et al.

(10) Patent No.: US 6,720,111 B2
(45) Date of Patent: Apr. 13, 2004

(54) SINGLE-PHASE LITHIUM FERRITE BASED OXIDE

(75) Inventors: Mitsuharu Tabuchi, Ikeda (JP); Kazuaki Ado, Ikeda (JP); Hironori Kobayashi, Ikeda (JP); Hikari Sakaebe, Ikeda (JP); Hiroyuki Kageyama, Ikeda (JP)

(73) Assignee: Secretary, Agency of Industrial Science and Technology, Tokyo-to (JP)

( * ) Notice: Subject to any disclaimer, the term of this patent is extended or adjusted under 35 U.S.C. 154(b) by 0 days.

(21) Appl. No.: 09/740,246

(22) Filed: Dec. 19, 2000

(65) Prior Publication Data

US 2002/0045098 A1 Apr. 18, 2002

(30) Foreign Application Priority Data

Aug. 31, 2000 (JP) ........................................ 2000-262043

(51) Int. Cl.[7] .............................................. H01M 4/48
(52) U.S. Cl. ................... 429/231.1; 429/224; 252/518.1; 252/520.21; 252/521.2; 252/182.1
(58) Field of Search ............................ 429/231.1, 224; 252/518.1, 520.21, 521.2, 182.1

(56) References Cited

U.S. PATENT DOCUMENTS 5,789,110 A * 8/1998 Saidi et al. ................. 429/224

FOREIGN PATENT DOCUMENTS

| JP | 08-295518 | 11/1996 |
|---|---|---|
| JP | 10-120421 | 5/1998 |
| JP | 2000-264637 | 9/2000 |
| JP | 2000-294242 | 10/2000 |

OTHER PUBLICATIONS

K. Ado et al./Preparation of LiFeO2 with Alpha–Na FeO2–Type Structure Using a Mixed–Alkaline Hydrothermal Method/J. Electrochem. Soc., 144, [7]/L177–L180/Jul. 1997.
R. Kanno et al./Synthesis, Structure, and Electrochemical Properties of a New Lithium Iron Oxide, LiFeO2, with a Corrugated Layer Structure/J. Electrochem.Soc., 143, [8]/2435–2442/Ausut 1996.
Y. Sakurai et al./Low Temperature Synthesis and Electrochemical Characteristics of LiFeO2 cathodes/J. Power Sources, 68/711–715/1997).
L. Bordet–Le Guenne, et al./Electrochemical Properties of Lithium Iron Oxides Prepared by Low Temperature Synthesis/Ionics, 4/220–226/1998).
C. Delmas et al./An Overview of the Li(Ni,M))x Systems: Syntheses, Structures and Properties/Electrochimica Acta.45/243–253/Sep. 30, 1999.
H. Kobyashi et al./Electrochemical Properties of Hydrothermally Obtained LiCo1–FexO2 as a Positive ElectrodeMaterial for Rechargeable Lithium Batteries/J. Electrochem. Soc., 147,[3]/960–969/Mar. 2000.
M. Tabuchi et al./10th International Meeting on Lithium Batteries "Lithium 2000"/Preparation of Lithium Manganese Oxide Including Iron/Abstract No.220/May 28, 2000.
M. Tabushi et al./Preparation and Electrochemical Properties of Fe or Co doped Li2MnO3/Abstract of 67th Convention of the Electrochemical Society of Japan/37/ Mar. 28, 2000 (With English Translation).

* cited by examiner

Primary Examiner—Laura Weiner
(74) Attorney, Agent, or Firm—Knobbe, Martens, Olson & Bear, LLP (57) ABSTRACT

The present invention provides a single-phase lithium ferrite based oxide which is suitable as a cathode material for a secondary battery, a process for preparing the oxide, and its uses, the oxide having a layered rock salt-type structure and comprising lithium ferrite (LiFeO$_2$)–Li$_{2-x}$MO$_{3-y}$ solid solution wherein M is at least one species selected from the group consisting of Mn, Ti and Sn, $0 \leq x < 2$, $0 \leq y \leq 1$ such that the proportion of iron is $0.1 \leq Fe/(Fe+M) \leq 0.9$.

7 Claims, 8 Drawing Sheets

SINGLE-PHASE LITHIUM FERRITE BASED OXIDE

The present invention relates to a single-phase lithium ferrite based oxide which is suitable as a cathode material (positive-electrode material) for lithium ion secondary batteries, a process for preparing the same and uses thereof.

In recent years, attention is directed to lithium ion secondary batteries for use as a secondary battery mounted on a portable device such as portable telephones, note-size personal computers or the like because of their high energy density. It is expected that this type of battery will be applied as a large-size battery for electric automobiles, power-load levelling systems and so on. In this situation, the importance of lithium ion secondary batteries is increasing.

The cathode material is closely related to battery performance such as working voltage of a battery (a difference between the redox potential of a transition metal in the cathode and the redox potential of anode element), and charge and discharge capacities (an amount of Li removable from or applicable to the cathode) so that presumably a demand for the cathode material will increase with an increase of a need for lithium ion secondary batteries.

Today lithium cobalt oxide ($LiCoO_2$) is in use as a cathode material for lithium ion secondary batteries. However, $LiCoO_2$ which contains a rare metal cobalt is one of the factors raising the costs of raw materials for lithium ion secondary batteries.

For example, lithium manganese oxide ($LiMn_2O_4$) is receiving attention for use as a cathode material which is inexpensive and substantially free from the resource problem. Now the lithium manganese oxide has been partly put to practical use.

Further it is desired to commercially provide cathode materials prepared from iron, i.e. a cheap metal element, for abundance of resources and low toxicity compared with manganese. For example, lithium ferrite ($LiFeO_2$) has been investigated for possible use as a material for electrodes. However, when lithium ferrite ($LiFeO_2$) is prepared from an iron source such as iron oxide and a Li source such as lithium carbonate by calcining them at a high temperature or hydrothermally treating them, the lithium ferrite can scarcely function for charging and discharging and lacks an activity for lithium secondary batteries (K. Ado, M. Tabuchi, H. Kobayashi, H. Kageyama, O. Nakamura, Y. Inaba, R. Kanno, M. Takagi and Y. Takeda, J. Eelectrochem. Soc., 144, [7], L177, (1997)).

On the other hand, lithium ferrite ($LiFeO_2$) prepared from α-$NaFeO_2$ or FeOOH by H/Li or Na/Li ion exchange method has a flat charge potential in the vicinity of 4V, but has a discharge potential less than 3V. Thus $LiFeO_2$ is lower in discharge potential by about 1V or more than $LiCoO_2$. Consequently it is difficult to use $LiFeO_2$ as a substitute for $LiCoO_2$ (R. Kanno, T. Shirane, Y. Kawamoto, Y. Takeda, M. Takano, M. Ohashi, and Y. Yamaguchi, J. Eelectrochem. Soc., 143, [8], 2435, (1996), Y. Sakurai, H. Arai, S. Okada, and J. Yamaki, J. Power Sources, 68, 711, (1997), L. Guenne, P. Deniard, A. Lecerf, P. Biensan, C. Siret, L. Fournes, and R. Brec, Ionics, 4, 220, (1998), and Japanese Unexamined Patent Publications 1998-120421 and 1996-295518).

On the other hand, Fe-doped $LiNiO_2$ and $LiCoO_2$, which are iron-containing oxides, are reported to exhibit $Fe^{3+}/Fe^{4+}$ redox behavior at about 4V (C. Delmas, M. Menetrier, L. Crogurnnec, I. Saadoune, A. Rougier, C. Pouillerie, G. Prado, M. Grune, L. Fournes, Electrochimica Acta. 45, 243, (1999) and H. Kobayashi, H. Shigemura, M. Tabuchi, H. Sakaebe, K. Ado, H. Kageyama, A. Hirano, R. Kanno, M. Wakita, S. Morimoto and S. Nasu, J. Electrochem. Soc., 147, [3], 960, (2000)).

However, the foregoing cathode materials contain Co or Ni, i.e., rare metals, so that the low-cost feature of iron is meaningless. Further the redox of iron may have been induced by the redox of Co or Ni, and it is unclear whether iron spontaneously undergoes $Fe^{3+}/Fe^{4+}$ redox.

Whether the lithium ferrite based oxide can be put to practical use as a cathode material for lithium ion secondary batteries is determined by whether it has flat charge and discharge potentials in the vicinity of 4V which are attributed to $Fe^{3+}/Fe^{4+}$ redox. As described above, a technique has been scarcely established for preparing inexpensive and resource-saving lithium ferrite based oxides having flat charge and discharge potentials in the vicinity of 4V due to $Fe^{3+}/Fe^{4+}$ redox potential. Consequently the development of the technique is desired.

A principal object of the present invention is to provide a single-phase lithium ferrite based oxide which is suitable as a cathode material for lithium ion secondary batteries, a process for preparing the same and uses thereof.

The present inventors conducted extensive research to overcome the foregoing prior art problems and found the following. When lithium ferrite ($LiFeO_2$) having a low discharge potential (3V or less) make a solid solution with a layered rock salt-type compound $Li_{2-x}MO_{3-y}$ wherein M is at least one species selected from the group consisting of Mn, Ti and Sn, the solid solution has charge and discharge potentials in the region of 4V, and the charge and discharge potentials correspond to $Fe^{3+}/Fe^{4+}$ redox potential. The present invention was completed based on this novel finding.

According to the present invention, there are provided single-phase lithium ferrite based oxides, cathode materials for a lithium ion secondary battery, processes for preparing the oxides (the solid solution) and a lithium ion secondary battery which are as follows.

1. A single-phase lithium ferrite based oxide having a layered rock salt-type structure, the oxide comprising lithium ferrite ($LiFeO_2$) based solid solution with $Li_{2-x}MO_{3-y}$ wherein M is at least one species selected from the group consisting of Mn, Ti and Sn, $0 \leq x < 2$, $0 \leq y \leq 1$ such that the proportion of iron is $0.1 \leq Fe/(Fe+M) \leq 0.9$ wherein M as defined above.

2. The single-phase lithium ferrite based oxide as defined in item 1, wherein the lithium ferrite ($LiFeO_2$) make a solid solution with $Li_{2-x}MO_{3-y}$ such that the proportion of iron is $0.21 \leq Fe/(Fe+M) \leq 0.75$.

3. A cathode material for a lithium ion secondary battery, the material comprising a single-phase lithium ferrite based oxide having a layered rock salt-type structure, the oxide comprising lithium ferrite ($LiFeO_2$) solid solution with $Li_{2-x}MO_{3-y}$ wherein M is at least one species selected from the group consisting of Mn, Ti and Sn, $0 \leq x < 2$, $0 \leq y \leq 1$ such that the proportion of iron is $0.1 \leq Fe/(Fe+M) \leq 0.9$.

4. The cathode material for a lithium ion secondary battery as defined in item 3, wherein the lithium ferrite ($LiFeO_2$) make a solid solution with $Li_{2-x}MO_{3-y}$ such that the proportion of iron is $0.15 \leq Fe/(Fe+M) \leq 0.75$.

5. A process for preparing a single-phase lithium ferrite based oxide having a layered rock salt-type structure, the oxide comprising lithium ferrite ($LiFeO_2$) solid solution with $Li_{2-x}MO_{3-y}$ wherein M is at least one species selected from the group consisting of Mn, Ti and Sn, $0 \leq x < 2$, $0 \leq y \leq 1$ such that the proportion of iron is $0.1 \leq Fe/(Fe+M) \leq 0.9$, the process comprising the steps of adding an aqueous solution of a lithium compound in a molar ratio (Li/(Fe+M)) of from 1 to 3 relative to the other metals to a mixed aqueous solution containing a water-soluble compound containing at least one species selected from the group consisting of Mn, Ti and Sn, and a water-soluble iron compound or to a water-alcohol mixed solution to give a precipitate, or adding a specified amount of lithium hydroxide to said mixed aqueous solution or said water-alcohol mixed solution, evaporating the aqueous solution and the precipitate to dryness, and calcining the residue in an oxidizing atmosphere or in a reducing atmosphere.

6. The process as defined in item 5, wherein the lithium ferrite ($LiFeO_2$) is solid-dissolved in $Li_{2-x}MO_{3-y}$ such that the proportion of iron is $0.2 \leq Fe/(Fe+M) \leq 0.75$.

7. A lithium ion secondary battery produced using the cathode material for a lithium ion secondary battery as defined in item 3.

According to the present invention, there is provided a single-phase lithium ferrite based oxide having a layered rock salt-type structure, the oxide comprising lithium ferrite ($LiFeO_2$) solid solution with $Li_{2-x}MO_{3-y}$ wherein M is at least one species selected from the group consisting of Mn, Ti and Sn, $0 \leq x < 2$, $0 \leq y \leq 1$ such that the proportion of iron is $0.1 \leq Fe/(Fe+M) \leq 0.9$. Hereinafter the lithium ferrite based oxide comprising $LiFeO_2$ solid solution with $Li_{2-x}MO_{3-y}$ may be referred to as "Fe-doped $Li_{2-x}MO_{3-y}$".

According to the invention, there is also provided a cathode material for a secondary battery, the material comprising a single-phase lithium ferrite based oxide having a layered rock salt-type structure, the oxide comprising lithium ferrite ($LiFeO_2$) based solid solution with $Li_{2-x}MO_{3-y}$ wherein M is at least one species selected from the group consisting of Mn, Ti and Sn, $0 \leq x < 2$, $0 \leq y \leq 1$ such that the proportion of iron is $0.1 \leq Fe/(Fe+M) \leq 0.9$.

Figure 1:
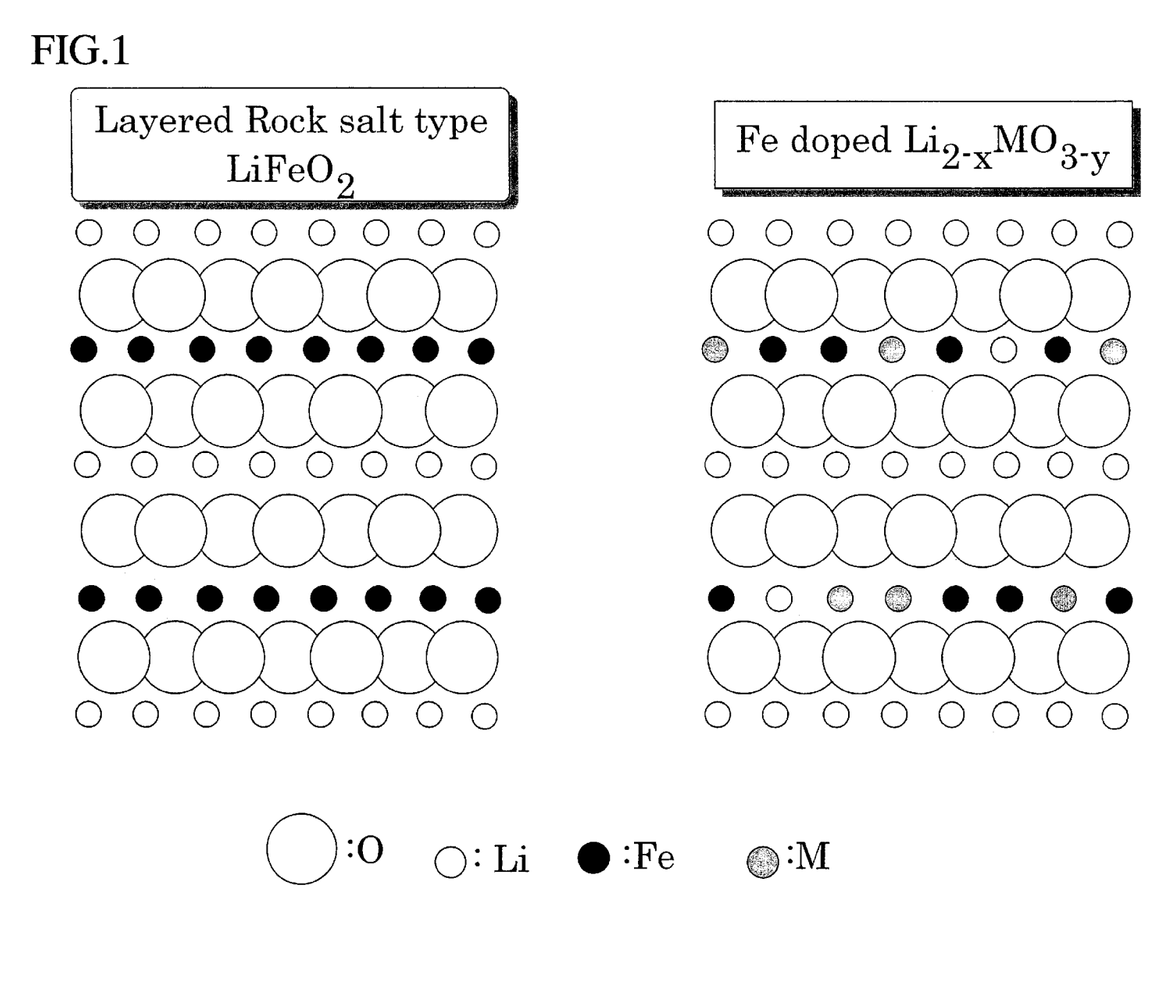
FIG. 1 shows the comparison of the structure of the lithium ferrite based oxide according to the invention with that of layered rock salt-type lithium ferrite.

The lithium ferrite based oxide of the invention and the cathode material for a secondary battery according to the invention have a layered rock salt-type structure as shown in FIG. 1. The structure of the lithium ferrite based oxide is similar to the structure of $LiCoO_2$ which is most frequently used now as a cathode material for secondary batteries. FIG. 1 shows also, for comparison, the crystal structure of a layered rock salt-type $LiFeO_2$. The lithium ferrite based oxide of the invention and the cathode material for secondary batteries according to the invention are characterized in that the iron ions partly occupy a transition metal-containing layer containing Fe, Li and M ions (FIG. 1).

The amount of iron ions in the lithium ferrite based oxide of the invention is about 10 to about 90% (i.e., $0.1 \leq Fe/(Fe+M) \leq 0.9$) based on the total amount of metal ions except Li. The lower limit of amount of iron ions (Fe/(Fe+M)) in the oxide is about 21%, preferably about 25%, more preferably about 30%, most preferably about 35%. The upper limit of amount of iron ions (Fe/(Fe+M)) in the oxide is about 75%, preferably about 70%, more preferably about 65%, most preferably about 60%.

The amount of iron ions in the oxide for the cathode material of the invention is about 10 to about 90% (i.e., $0.1 \leq Fe/(Fe+M) \leq 0.9$) based on the total amount of metal ions except Li. The lower limit of amount of iron ions (Fe/(Fe+M)) in the oxide is about 15%, preferably about 20%, more preferably about 25%, most preferably about 30%. The upper limit of amount of iron ions in the oxide is about 75%, preferably about 70%, more preferably about 65%, most preferably about 60%. The excessive amount of iron ions increases the amount of iron which does not participate in charging and discharging. Thus, the excessive amount is undesirable in terms of the characteristics of batteries. On the other hand, an excessively small amount of solid-dissolved iron ions are likely to result in too small charge and discharge capacities.

The value of x in $Li_{2-x}MO_{3-y}$ may be in a positive range insofar as the value is in the range which retains the layered rock salt-type crystal structure. Nevertheless the value of x as close to 0 as possible is desirable from the viewpoint of charge capacity. The value of x is usually approximately $0 \leq x < 2$, preferably approximately $0 \leq x \leq 1$, more preferably approximately $0 \leq x \leq 0.5$.

The value of y in $Li_{2-x}MO_{3-y}$ is usually approximately $0 \leq y \leq 1$, preferably approximately $0 \leq y \leq 0.5$, more preferably approximately $0 \leq y \leq 0.2$.

The cathode material of the invention may contain a phase of impurity such as $Li_2CO_3$ in the range which would not seriously affect the charge and discharge characteristics.

There is no limitation on processes for preparing the single-phase lithium ferrite based oxide of the invention nor on processes for preparing the cathode material of the invention. For example, they can be prepared by conventional processes for preparing ceramics such as a hydrothermal reaction process, a calcining process and the like. However, conventional calcining processes comprising dry-blending an iron oxide and manganese, titanium or tin oxide with a lithium source such as lithium carbonate and calcining the blend are unlikely to induce homogeneous blending between iron and other metals, making it difficult to obtain a homogeneous sample. For this drawback, the conventional calcining processes can not produce 20% or more Fe-doped single-phase lithium ferrite based oxide. A novel calcining process capable of producing 20% or more Fe-doped single-phase lithium ferrite based oxide is described below by way of example, and then a producing process involving a hydrothermal reaction is described as an example of conventional processes for preparing ceramics.

A calcining process capable of preparing 20% or more Fe-doped single-phase lithium ferrite based oxide comprises the steps of adding a lithium compound such as lithium hydroxide in a molar ratio (Li/(Fe+M)) of from about 1 to about 3 relative to the other metals to a mixed aqueous solution containing a water-soluble compound containing at least one species selected from the group consisting of Mn (e.g., divalent, trivalent or tetravalent Mn), Ti (e.g., trivalent or tetravalent Ti) and Sn (e.g., divalent or tetravalent Sn) and a water-soluble iron compound (e.g., divalent or trivalent Fe), or to a water-alcohol (such as ethanol or methanol) mixed solution to give a precipitate, or adding a specified amount of lithium hydroxide or like lithium compound to said mixed aqueous solution or said water-alcohol mixed solution, evaporating the solution and the precipitate to dryness, and calcining the residue in an oxidizing atmosphere or in a reducing atmosphere.

Examples of the water-soluble compound containing Mn, Ti or Sn which is used in the calcining process of the invention are chlorides, nitrates, sulfates, acetates and hydroxides of these metals. Usable as the metal source are aqueous solutions of oxides of metals such as Mn, Ti or Sn in an acid such as hydrochloric acid. These materials for the metal source may be either an anhydride or a hydrate. The foregoing water-soluble compounds can be used either alone or in combination.

In the calcining process, the amount of lithium used as the raw material should be adjusted to a molar ratio (Li/(Fe+M)) relative to the other metals. The value may range from about 1 to about 3, preferably about 1.5 to about 2.5.

The mixing ratio of the water-soluble compound containing at least one species selected from Mn, Ti and Sn and the water-soluble iron compound which are used in the calcining process is suitably determined according to the molar ratio of Fe/(Fe+M)(wherein M is at least one species selected from Mn, Ti and Sn) in the contemplated based oxide. Namely the value of Fe/(Fe+M) in the raw materials substantially corresponds with that of Fe/(Fe+M) in the contemplated based oxide.

The calcining conditions can be suitably selected according to the kind of compounds to be used as the metal source or the like. The calcination can be conducted, for example, in the atmosphere or like oxidizing atmosphere, or hydrogen-containing atmosphere or like reducing atmosphere. The calcining temperature is about 200 to about 1000° C., preferably about 300 to about 800° C. The calcining time is about 1 to about 100 hours, preferably about 20 to about 60 hours.

Optionally the product obtained by the calcination may be crushed and the obtained powder may be calcined again under the same conditions as above.

The above-mentioned novel calcining process can produce 20% or less Fe-doped single-phase lithium ferrite based oxide as well as 20% or more Fe-doped single-phase lithium ferrite based oxide.

The producing process utilizing a hydrothermal reaction is exemplified below. For example, a process is available which comprises the steps of adding an aqueous solution of alkali to an aqueous solution containing a water-soluble compound containing at least one species selected from the group consisting of Mn (e.g., divalent, trivalent or tetravalent Mn), Ti (e.g., trivalent or tetravalent Ti) and Sn (e.g., divalent or tetravalent Sn) and a water-soluble iron salt (e.g., divalent or trivalent iron salt) such as iron nitrate (III), or to a water-alcohol mixed solution to give a precipitate, and hydrothermally treating the precipitate together with a lithium compound in the presence of an oxidizing agent and potassium hydroxide at 100 to 400° C.

Examples of the alkali to be used are lithium hydroxide, sodium hydroxide, potassium hydroxide and ammonia water. Examples of the lithium compound to be hydrothermally treated along with the coprecipitate are lithium hydroxide (either an anhydride or a hydrate), lithium chloride, lithium nitrate and the like.

The hydrothermal process employs a solution prepared by dissolving iron and manganese, titanium or tin salt in water, a water-alcohol solvent mixture or the like in a total concentration of about 0.01 to about 2 M, preferably about 0.1 to about 0.5 M (calculated based on anhydride). The molar ratio Fe/(Fe+M) is suitably determined according to Fe/(Fe+M) in the contemplated single-phase lithium ferrite based oxide.

While the above-mentioned mixed solution is stirred, an alkaline aqueous solution containing potassium hydroxide, sodium hydroxide or the like in a concentration of about 0.1 to about 20 M, preferably about 0.5 to about 10 M is added dropwise until the solution is rendered completely alkaline (preferably until the pH is adjusted to 11). After dropwise addition, aging treatment is performed at 0 to about 150° C., preferably about 20 to about 100° C. while blowing the air to obtain a precipitate. The obtained precipitate is washed with water to remove the excess alkali component and the residual salts. The precipitate is removed from the solution by filtration and dried at about 100° C., thereby giving a coprecipitate. The coprecipitate is mixed with water in a vessel (e.g., polytetrafluoroethylene beaker). A lithium compound such as lithium hydroxide is added to the solution.

The amount of the lithium compound to be added is determined such that the concentration of the compound in the solution is about 0.1 to about 10 M, preferably about 1 to about 8 M. An oxidizing agent such as potassium chlorate is added to the solution. The amount of the oxidizing agent to be added is determined such that the concentration of the agent in the solution is about 0.1 to about 10 M, preferably about 1 to about 5 M. The vessele containing the solution was left to stand in a hydrothermal reaction device (e.g., commercially available autoclave) to make a hydrothermal reaction. The reaction conditions are not limited but the reaction temperature is about 100 to about 300° C., preferably about 150 to about 250° C. The reaction time is not limited but preferably about 0.1 to about 150 hours, more preferably about 1 to about 100 hours. The hydrothermal reaction can be carried out, for example, in the atmosphere or like oxidizing atmosphere. After completion of the reaction, the reaction product may be optionally washed with water, filtered and dried to remove the excess residual salts and the like. In this way, the desired layered rock salt-type single-phase lithium ferrite based oxide is obtained. To improve the crystallizability of the sample, optionally the hydrothermally obtained sample may be mixed with a Li compound and the mixture may be calcined in the atmosphere or like oxidizing atmosphere. The calcining conditions may be the same as in the calcining process of the invention.

The single-phase lithium ferrite based oxide of the invention and the cathode material for lithium ion secondary batteries according to the invention can be applied to lithium ion secondary batteries by conventional methods. Useful anode materials are not limited and include, for example, metal lithium, carbon and the like. Useful electrolytes are not limited and can be suitably selected according to the upper limit of potential and the like. Examples of useful electrolytes include lithium perchlorate, $LiPF_6$ and like lithium salts. Examples of useful solvents for the electrolyte are ethylene carbonate, dimethyl carbonate and the like.

According to the present invention, there can be obtained an inexpensive and high-capacity lithium ferrite based oxide useful as a cathode material for lithium ion secondary batteries.

Given below are Examples to further clarify the features of the present invention in more detail.

The crystalline phase of the samples obtained in the Examples was evaluated by X-ray diffraction analysis. The valence state of iron in the sample was evaluated by $^{57}Fe$ Mössbauer spectroscopies, and the valence state of manganese was analyzed by X-ray absorption spectrum in MnK absorption edge. The composition of the sample was evaluated by inductively-coupled plasma (ICP) and atomic-absorption spectroscopy.

A coin-type lithium battery was produced using the sample as the cathode and metal lithium as the anode to investigate the charge and discharge characteristics of the battery.

EXAMPLE 1

A 6.06 g quantity of iron nitrate (III) nonahydrate and 24.40 g of manganese nitrate (II) hexahydrate (Fe:Mn molar ratio=15:85) were added to 50 ml of distilled water to completely dissolve them in distilled water. While stirring the solution, an aqueous solution of lithium hydroxide (8.392 of lithium hydroxide monohydrate dissolved in 100 ml of distilled water) was gradually added dropwise until Li/(Fe+Mn)=2.0 (molar ratio) was attained, whereby a precipitate was obtained. The obtained precipitate was dried at 100° C. in the atmosphere for a few days and was heated at 400° C. in the atmosphere for 48 hours. Then the obtained precipitate was crushed and heated again at 700° C. in the atmosphere for 20 hours, whereby a powdery product (15% Fe-doped $Li_{2-x}MnO_{3-y}$) was obtained.

Figure 2:
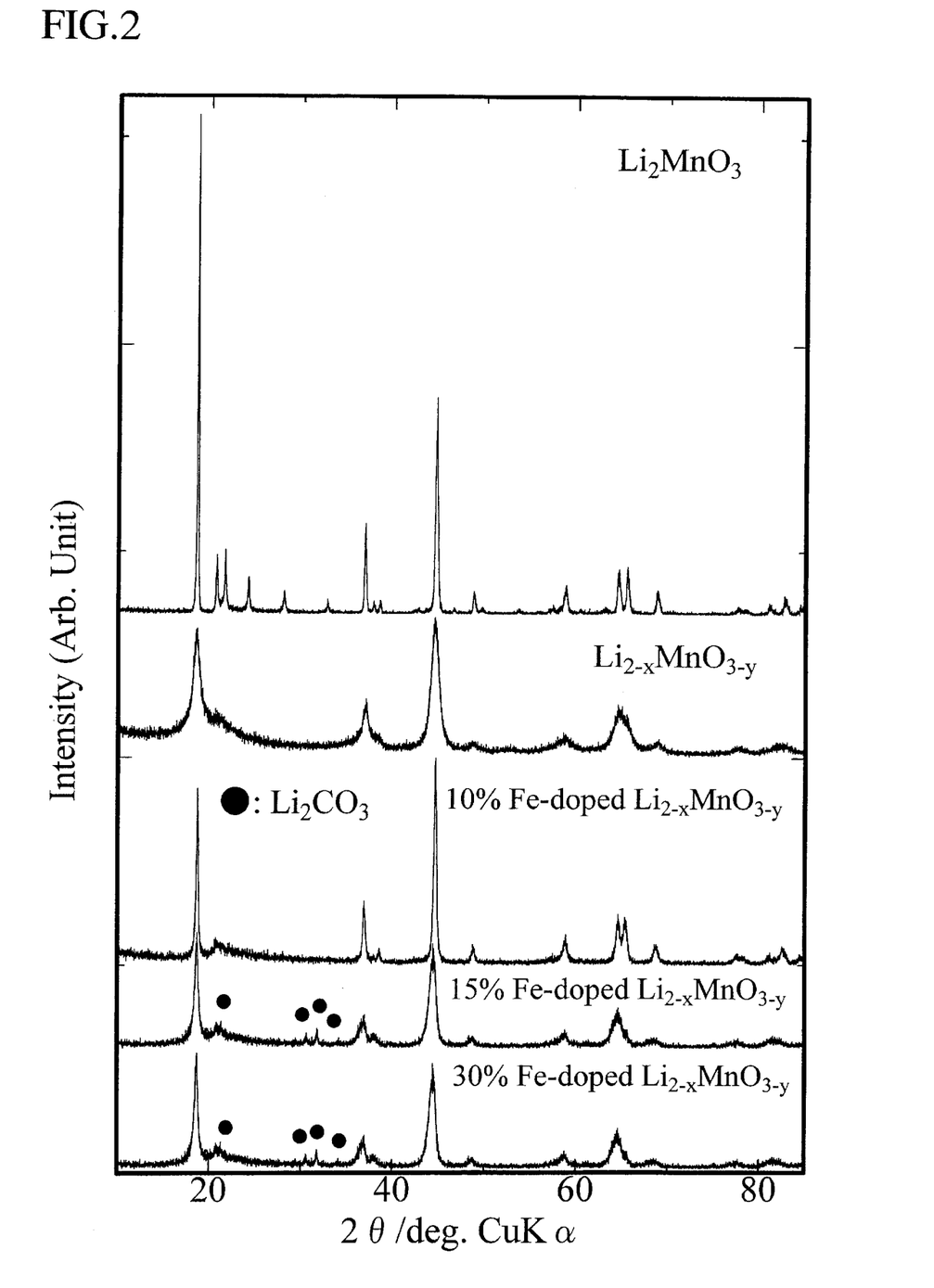
FIG. 2 shows the comparison of X-ray diffraction pattern for Fe-doped $Li_{2-x}MnO_{3-y}$ with that for the Fe-undoped sample.

FIG. 2 shows the X-ray diffraction pattern for the final product. All of peaks excepting small peaks belonging to lithium carbonate ($Li_2CO_3$) were fitted by using the unit cells (space group: $R\bar{3}m$, a=2.851 Å, c=14.259 Å) of layered rock salt-type $Li_{2-x}MnO_{3-y}(Li_{1.20}MnO_{2.20})$ described in the literature shown below (M. H. Rossouw, D. C. Lies and M. M. Thackeray, J. Solid State Chem., 104, 464, (1993)).

The production of 15% Fe-doped $Li_{2-x}MnO_{3-y}$ was supported by the following facts: (i) a lattice constant (a=2.85880(18)Å, c=14.2194(13)Å) calculated from the peaks of 15% Fe-doped $Li_{2-x}MnO_{3-y}$ obtained was similar to the value described in the literature, (ii) the content of iron in the product was 15% when determined by chemical analysis (Table 1) as found in the raw materials, and (iii) Li/(Fe+Mn)≈2.

COMPARATIVE EXAMPLE 1

A 4.95 g quantity of manganese chloride (II) tetrahydrate was placed into a polytetrafluoroethylene beaker. Then 100 ml of distilled water was added to completely dissolve the compound therein. Added to the aqueous solution were 50 g of potassium chlorate, 20 g of lithium hydroxide monohydrate and 120 g of potassium hydroxide. The solution was thoroughly stirred, giving a precipitate. The beaker containing the precipitate was left to stand in a hydrothermal reaction furnace (autoclave). Then, the precipitate was subjected to hydrothermal reaction in the atmosphere at 220° C. for 48 hours. After completion of the reaction, the reaction furnace was cooled to the vicinity of room temperature. After the beaker was taken out from the autoclave, the obtained precipitate was washed with distilled water to remove the excess lithium hydroxide and the other salts, filtered and dried, whereby a powdery product ($Li_2MnO_3$) was obtained.

FIG. 2 shows the X-ray diffraction pattern for the final product. All peaks were fitted by using the unit cells (space group: C2/m, a=4.9245(1)Å, b=8.5215(1)Å, c=5.0244(1)Å, β=109.3983(8)°) of $Li_2MnO_3$ of monoclinic form described in the literature shown below (V. Masarotti, D. Capisoni, M. Bini, C. B. Azzoni, and A. Paleari, J. Solid State Chem., 128, 80, (1997)). A lattice constant (a=4.9303(4)Å, b=8.5317(5) Å, c=5.0244(3)Å, β=109.336(6)°) calculated from the peaks of $Li_2MnO_3$ obtained was similar to the value reported therein. The production of $Li_2MnO_3$ was supported by chemical analysis (Table 1) revealing that the value of Li/Mn was 1.94, namely close to 2.

TABLE 1

Results of chemical analysis of Fe-doped $Li_{2-x}MnO_{3-y}$ samples

| Iron content (in raw materials) | Li/wt % | Fe/wt % | Mn/wt % | Li/(Mn + Fe)* | Fe/(Fe + Mn)* |
|---|---|---|---|---|---|
| 0% ($Li_2MnO_3$) | 11.5(1) | — | 47.1(3) | 1.94(2) | — |
| 0% ($Li_{2-x}MnO_{3-y}$) | 8.00(8) | — | 47.0(5) | 1.35(4) | — |
| 10% | 10.1(1) | 4.81(3) | 42.6(3) | 1.69(3) | 0.10(1) |
| 15% | 11.4(1) | 6.74(2) | 37.5(1) | 2.05(3) | 0.15(1) |
| 30% | 11.0(1) | 13.2(1) | 30.2(1) | 2.04(1) | 0.30(1) |
| 30% (after charging)** | 1.77(1) | 12.7(1) | 29.9(1) | 0.33(1) | 0.29(1) |

Note: *= molar ratio, **= data after charging to 4.8 V

EXAMPLE 2

A 12.12 g quantity of iron nitrate (III) nonahydrate and 20.09 g of manganese nitrate (II) hexahydrate (Fe:Mn molar ratio=3:7) were added to 50 ml of distilled water to completely dissolve them therein. While stirring the solution, an aqueous solution of lithium hydroxide (8.392 g of lithium hydroxide monohydrate dissolved in 100 ml of distilled water) was gradually added dropwise until Li/(Fe+Mn)= 2.00 (molar ratio) was attained, whereby a precipitate was obtained. The obtained precipitate was dried at 100° C. in the atmosphere for a few days and was calcined at 400° C. in the atmosphere for 48 hours. Then the obtained precipitate was crushed and calcined again at 600° C. in the atmosphere for 20 hours, whereby a powdery product (30% Fe-doped $Li_{2-x}MnO_{3-y}$) was obtained.

FIG. 2 shows the X-ray diffraction pattern for the final product. All peaks excepting small peaks belonging to lithium carbonate ($Li_2CO_3$) were fitted by using the unit cells (space group: $R\bar{3}m$, a=2.851 Å, c=14.259 Å) of layered rock salt-type $Li_{2-x}MnO_{3-y}(Li_{1.20}MnO_{2.20})$ described in the literature shown below (M. H. Rossouw, D. C. Lies and M. M. Thackeray, J. Solid State Chem., 104, 464, (1993)). The production of 30% Fe-doped $Li_{2-x}MnO_{3-y}$ was supported by the following facts: (i) a lattice constant (a=2.8742(3)Å, c=14.247(3)Å) calculated from the peaks of 30% Fe-doped $Li_{2-x}MnO_{3-y}$ obtained was similar to the value described in the literature, (ii) the content of iron in the product was 30% when determined by chemical analysis (Table 1) as found in the raw materials, and (iii) Li/(Fe+Mn)≈2.

COMPARATIVE EXAMPLE 2

A 3 g quantity of manganese dioxide was placed into a polytetrafluoroethylene beaker. Then, 100 ml of distilled water and 48 g of lithium hydroxide monohydrate were added, followed by thorough stirring. The beaker containing the mixture was left to stand in a hydrothermal reaction furnace (autoclave), and the mixture was subjected to hydrothermal reaction in the atmosphere at 220° C. for 4 hours. After completion of the reaction, the reaction furnace was cooled to the vicinity of room temperature. Then the beaker was taken out from the autoclave, and the obtained precipitate was washed with distilled water to remove the excess lithium hydroxide and the other salts, and was filtered and dried, whereby a powdery product ($Li_{2-x}MnO_{3-y}$) was obtained.

FIG. 2 shows the X-ray diffraction pattern for the final product. All peaks were fitted by using the unit cells (space group: $R\bar{3}m$, a=2.851(1)Å, c=14.259 Å) of layered rock salt-type $Li_{2-x}MnO_{3-y}(Li_{1.20}Mo_{2.20})$ described in the literature shown below (M. H. Rossouw, D. C. Lies and M. M. Thackeray, J. Solid State Chem., 104, 464, (1993)). A lattice constant (a=2.846(4)Å, c=14.26(3)Å) calculated from the peaks of $Li_{2-x}MnO_{3-y}$ obtained was similar to the value reported therein. The production of layered rock salt-type $Li_{2-x}MnO_{3-y}$ was supported by chemical analysis (Table 1) revealing that the value of Li/Mn was 1.35.

EXAMPLE 3

A 10.10 g quantity of iron nitrate (III) nonahydrate and 44.53 g of manganese chloride (II) tetrahydrate were added to 400 ml of distilled water to completely dissolve them in distilled water. While stirring the aqueous solution, an aqueous solution of sodium hydroxide (72 g of sodium hydroxide dissolved in 400 ml of distilled water) was gradually added dropwise until the solution was adjusted to a pH of about 11 or more. While the air was blown into the solution containing the coprecipitate with stirring, the solution was oxidized at room temperature in the air for 3 days. The obtained precipitate was washed with distilled water, filtered and dried at 100° C. A polytetrafluoroethylene beaker was charged with 2.7 g of the dried precipitate, 8 g of lithium hydroxide monohydrate, 10 g of potassim chlorate and 50 ml of distilled water. After the contents were thoroughly stirred, the beaker containing the mixture was placed in a hydrothermal reaction furnace (autoclave). Then, hydrothermal reaction was conducted in the autoclave at 240° C. for 72 hours. After completion of the reaction, the reaction furnace was cooled to the vicinity of room temperature. Then the beaker was taken out from the autoclave, and the obtained precpitate was washed with distilled water to remove the excess lithium hydroxide and the other salts, followed by being filtered and dried, whereby a powdery product (10% Fe-doped $Li_{2-x}MnO_{3-y}$) was obtained.

FIG. 2 shows the X-ray diffraction pattern for the final product. All peaks were fitted by using the unit cells (space group: $R\bar{3}m$, a=2.851 Å, c-14.259 Å) of layered rock salt-type $Li_{2-x}MnO_{3-y}(Li_{1.20}MnO_{2.20})$ described in the literature shown below (M. H. Rossouw, D. C. Lies and M. M. Thackeray, J. Solid State Chem., 104, 464, (1993)).

The production of 10% Fe-doped $Li_{2-x}MnO_{3-y}$ was confirmed by the following facts: (i) a lattice constant (a=2.85577(14)Å, c=14.2181 (10)Å) calculated from the peaks of 10% Fe-doped $Li_{2-x}MnO_{3-y}$ obtained was similar to the value described in the literature, (ii) the content of iron in the product was 10% as determined by chemical analysis (Table 1) as in the raw materials, and (iii) Li/(Fe+Mn)≈1.7.

COMPARATIVE EXAMPLE 3

A 8.08 g quantity of iron nitrate (III) nonahydrate and 22.96 g of manganese nitrate (II) hexahydrate (Fe:Mn molar ratio=2:8) were added to 50 ml of distilled water to completely dissolve them in distilled water. While stirring the solution, an aqueous solution of lithium hydroxide (7.97 g of lithium hydroxide monohydrate dissolved in 100 ml of distilled water) was gradually added dropwise until Li/(Fe+Mn)=1.90 (molar ratio) was attained, whereby a precipitate was obtained. The obtained precipitate was dried at 100° C. in the atmosphere for a few days and was calcined at 600° C. in the atmosphere for 48 hours. Then the obtained precipitate was crushed and calcined again at 600° C. in the atmosphere for 20 hours, whereby a powdery product (20% Fe-doped $Li_{2-x}MnO_{3-y}$) was obtained.

The X-ray diffraction pattern for the final product shows that the product contains layered rock salt-type $Li_{2-x}MO_{3-y}$ and a cubic form of $\alpha$-$LiFeO_2$ admixed therewith. This means that the process failed to produce a single-phase 20% Fe-doped $Li_{2-x}MO_{3-y}$.

EXAMPLE 4

Figure 3:
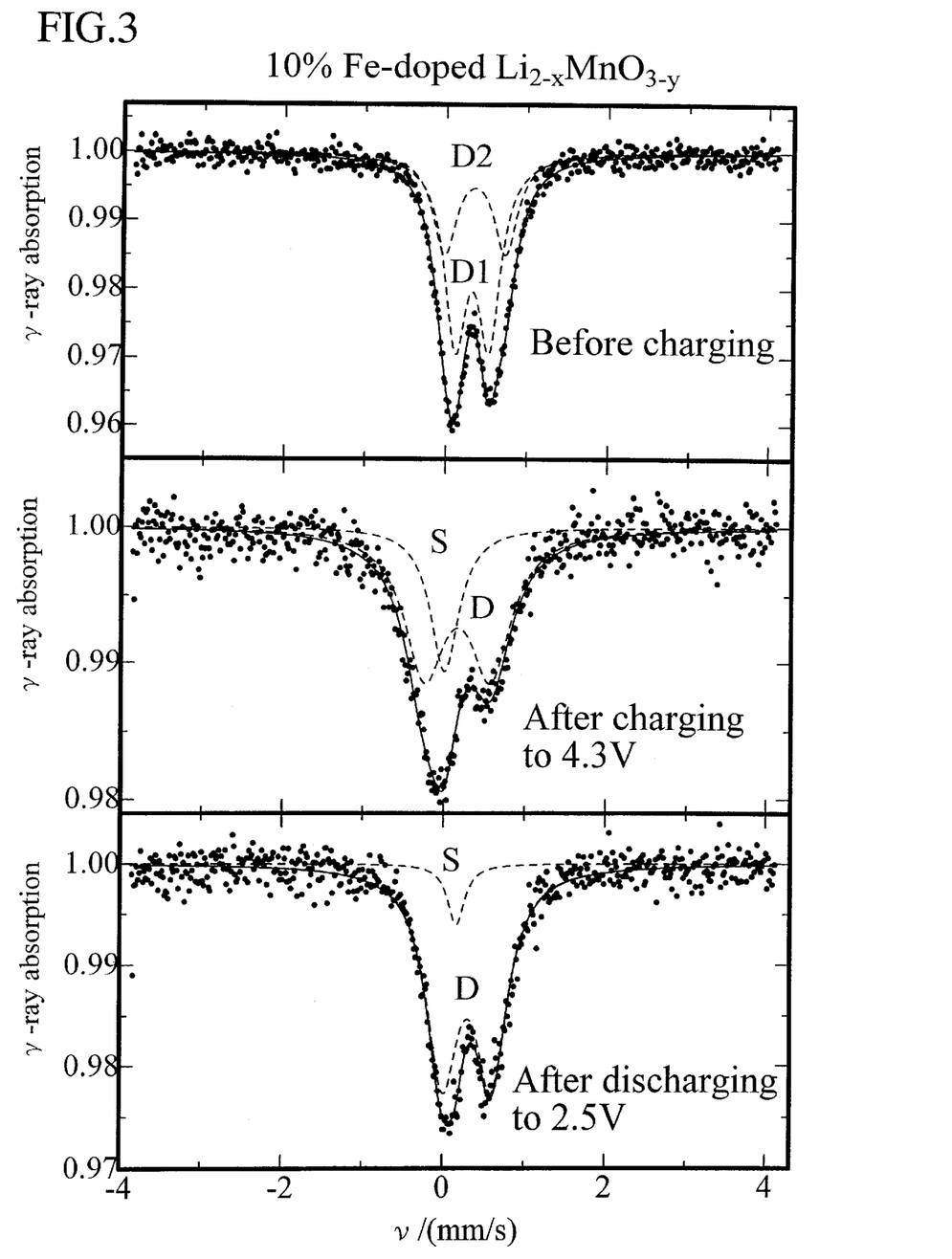
FIG. 3 shows a change in $^{57}$Fe Mössbauer spectroscopic spectrum for 10% Fe-doped sample before and after charging and discharging. In the drawing, indicated at S is a singlet component, and at D is a doublet component. Dots represent observed values. A solid line represents a calculated value. Broken lines represent singlet component (S) and each doublet component (D1 and D2).
Figure 4:
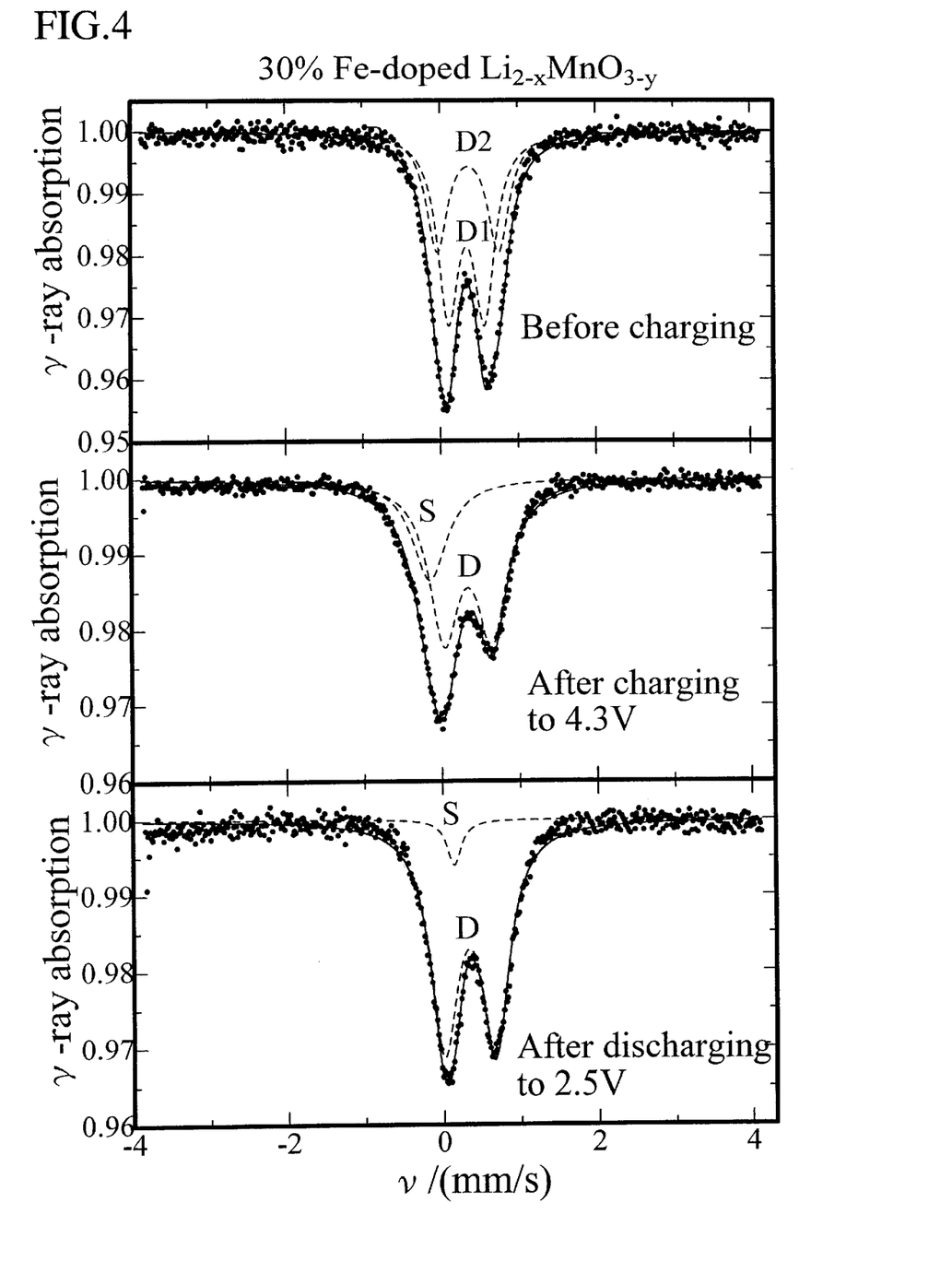
FIG. 4 shows a change in $^{57}$Fe Mössbauer spectroscopic spectrum for 30% Fe-doped sample before and after charging and discharging. In the drawing, indicated at S is a singlet component, and at D is a doublet component. Dots represent observed values. A solid line represents a calculated value. Broken lines represent singlet component (S) and each doublet component (D1 and D2).

To confirm the valence state of iron in the samples prepared in the Example 2 and Example 3, 10% and 30% Fe-doped $Li_{2-x}MnO_{3-y}$ samples were subjected at room temperature to $^{57}Fe$ Mössbauer spectroscopies (see the spectral data before charging and discharging in FIGS. 3 and 4). The obtained spectra can be considered as doublets and reveal that the samples were paramagnetic at room temperature. Since the doublets were asymmetric, the fitting was conducted using two doublet components (D1 and D2) having slightly different isomer shift values (IS values). Table 2 shows the parameters of the two components. The IS values of the two components were approximately +0.32 to 0.36 mm/s, and were close to the IS value (+0.37 mm/s) described in the following literature, namely that of $\alpha$-$NaFeO_2$ which was a typical one of high-spin $Fe^{3+}$ oxides. This shows that the iron in the two samples maintained high-spin $Fe^{3+}$ state (M. Tabuchi, K. Ado, H. Kobayashi, H. Sakaebe, H. Kageyama, C. Masquelier, M. Yonemura, A. Hirano and R. Kanno, J. Mater. Chem., 9, 199, (1999)).

TABLE 2

(Comparison of Mössbauer spectral parameters of 10%/30% Fe-doped $Li_{2-x}MnO_{3-y}$ with the values formerly reported)

| Sample | Component | Isomer shift Value (mm/s) | quadrupole splitting value | Area ratio (%) |
|---|---|---|---|---|
| 10% Fe-doped $Li_{2-x}MnO_{3-y}$ (before charging and discharging) | D1 | +0.353(5) | 0.75(2) | 37 |
| | D2 | +0.322(2) | 0.416(13) | 63 |
| After charging to 4.3 V | D | +0.170(8) | 0.817(18) | 74 |
| | S | +0.007(9) | — | 26 |
| After discharging to 2.5 V | D | +0.302(4) | 0.604(8) | 93 |
| | S | +0.165(13) | — | 7 |
| 30% Fe-doped $Li_{2-x}MnO_{3-y}$ (before charging and discharging) | D1 | +0.339(2) | 0.464(12) | 59 |
| | D2 | +0.359(3) | 0.789(19) | 41 |
| After charging to 4.3 V | D | +0.341(3) | 0.615(4) | 71 |
| | S | −0.148(5) | — | 29 |
| After discharging to 2.5 V | D | +0.3319(12) | 0.656(2) | 95 |
| | S | +0.145(6) | — | 5 |
| $\alpha$-$NaFeO_2$ (Ref. 1) | — | +0.366 | 0.468 | 100 |
| $\alpha$-$Na_{0.5}FeO_2$ (Ref. 2) | $Fe^{3+}$ | +0.314 | 0.870 | 59 |
| | $Fe^{4+}$ | +0.07 | 0.714 | 41 |
| $SrFeO_{2.97}$ (Ref. 3) | *$Fe^{4+}$ | +0.06 | — | 94 |
| | *$Fe^{3+}$ | +0.32 | — | 6 |

Note: * = singlet peak.

In Table 2, Ref. 1 is M. Tabuchi, K. Ado, H. Kobayashi, H. Sakaebe, H. Kageyama, C. Masquelier, M. Yonemura, A. Hirano and R. Kanno, J. Mater. Chem., 9, 199, (1999). Ref. 2 is Y. Takeda, K. Nakahara, M. Nishijima, N. Imanishi, O. Yamamoto, M. Takano and R. Kanno, Mat. Res. Bull., 29, [6]659, (1994). Ref. 3 is Y. Takeda, R. Kanno, T. Takada, O. Yamamoto, M. Takano, N. Nakayama, and Y. Bando, J. Solid State Chem., 63, 237, (1986).

Figure 5:
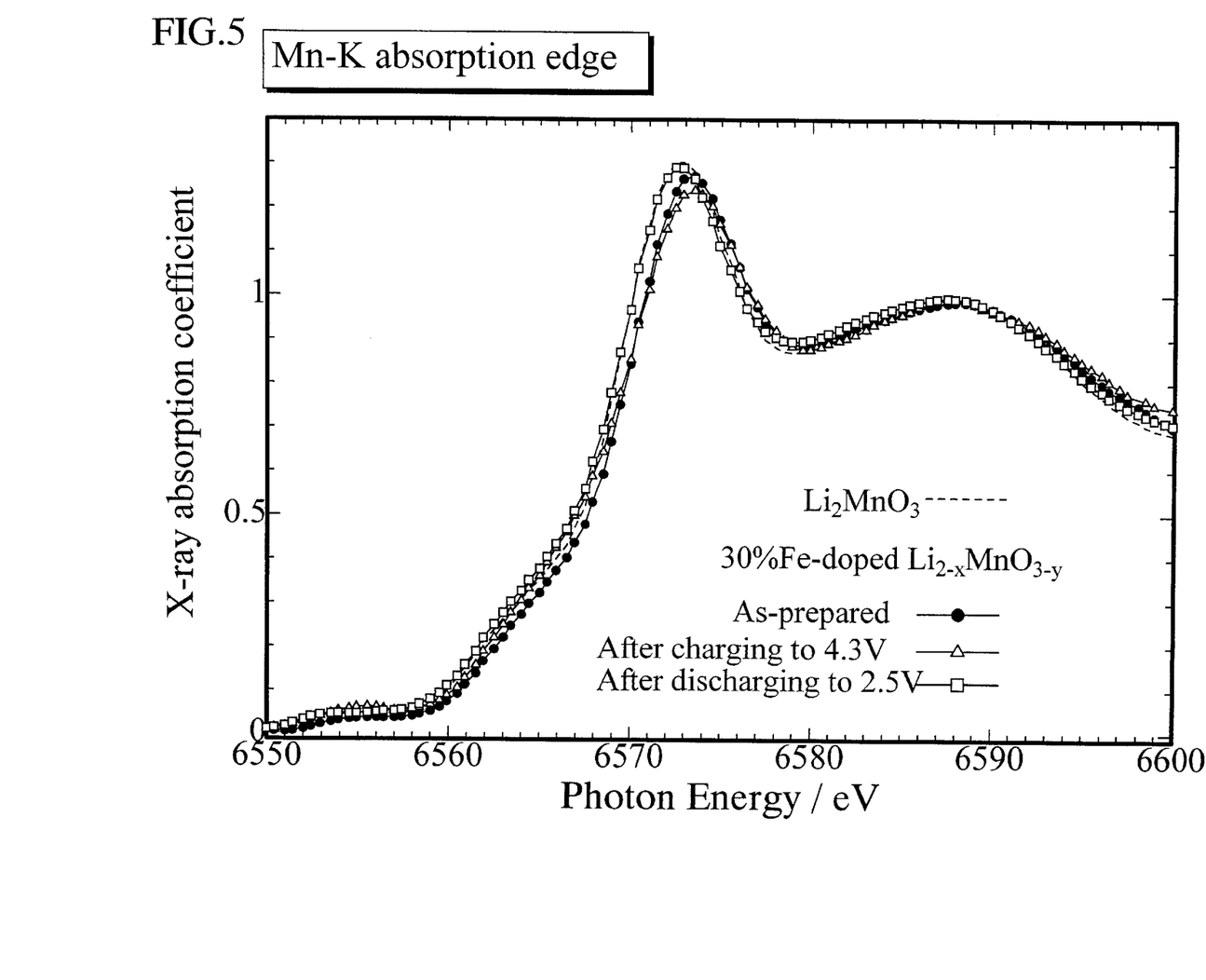
FIG. 5 shows an X-ray absorption spectrum in MnK absorption edge for 30% Fe-doped $Li_{2-x}MnO_{3-y}$ (after sysnthesis: ●, after charging to 4.3V: ∆, and after discharging to 2.5V: □) and also indicates, for reference, an X-ray absorption spectrum for monoclinic form of $Li_2MnO_3$.

To investigate the valence state of manganese in the samples, X-ray absorption spectral measurement in MnK-absorption edge was made of 30% Fe-doped $LiMnO_2$ sample which was prepared in Example (FIG. 5). $Li_2MnO_3$ of monoclinic form (tetravalent manganese compound) prepared in Comparative Example 1 was used as a standard sample. The obtained spectrum is shown as virtually superposed over the spectrum of $Li_2MnO_3$ of monoclinic form. Thus, it is presumable that the manganese in the sample maintained the tetravalent state as in $Li_2MnO_3$ of monoclinic form.

EXAMPLE 5

Figure 6:
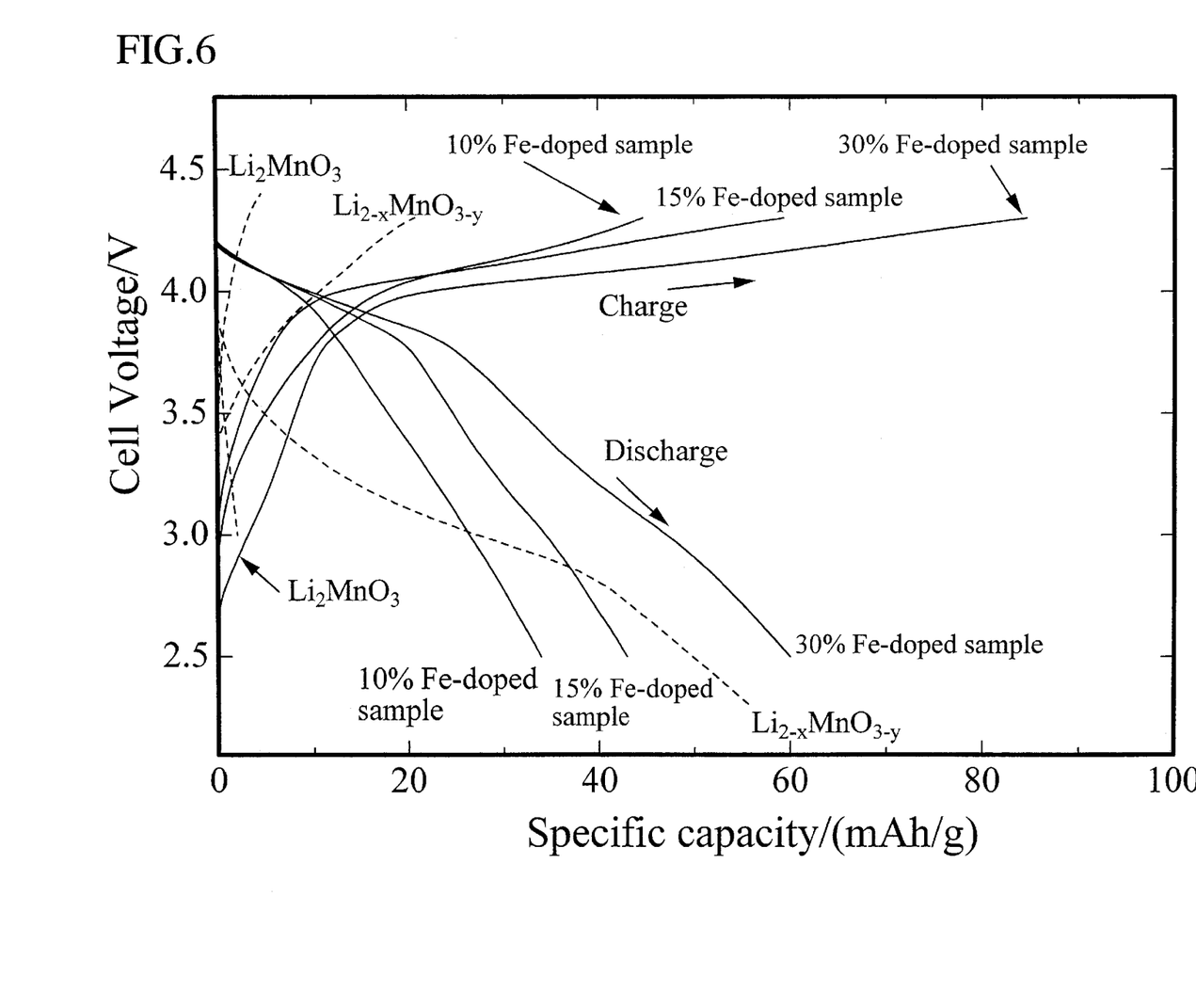
FIG. 6 shows the initial charge and discharge characteristics of a coin-type lithium battery produced using Fe-undoped or Fe-doped $Li_{2-x}MnO_{3-y}$ as the cathode and Li metal as the anode. A rightward ascending curve corresponds to a charging curve, and a rightward descending curve corresponds to a discharging curve. The range of potential is 2.5 to 4.3V (Fe-doped sample) and a current density is 7.5 mA/g.
Figure 7:
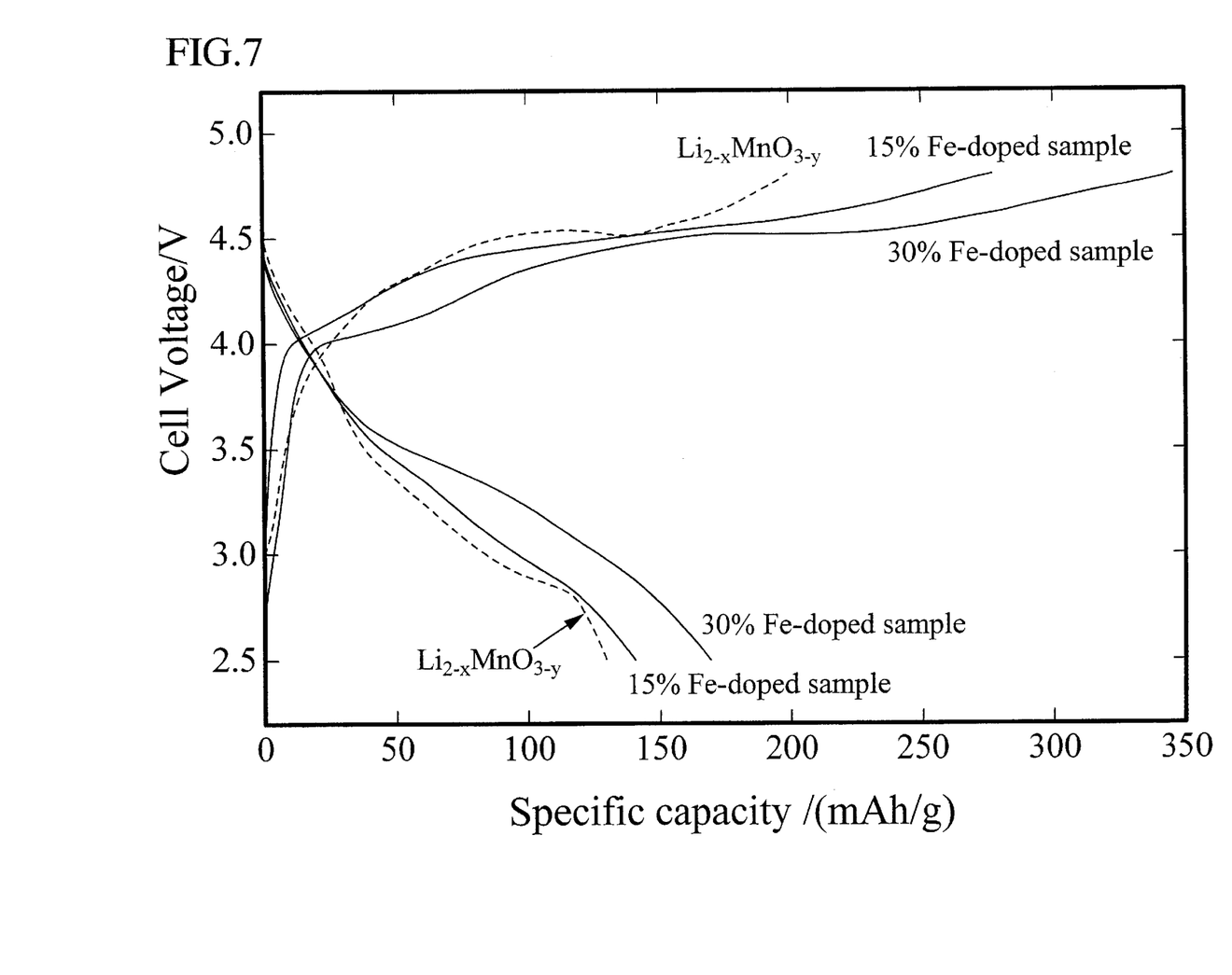
FIG. 7 shows the initial charge and discharge characteristics of a coin-type lithium battery produced using Fe-undoped or Fe-doped $Li_{2-x}MnO_{3-y}$ as the cathode and Li metal as the anode. A rightward ascending curve corresponds to a charging curve, and a rightward descending curve corresponds to a discharging curve. The range of potential is 2.3 to 4.8V and a current density is 7.5 mA/g.

An investigation was made on the charge and discharge characteristics of lithium battery (current density 7.5 mA/g) using the sample prepared according to the invention as the cathode, metal lithium as the anode and a 1M solution as the electrolyte, the 1M solution being prepared by dissolving lithium perchlorate (at 4.4V or less in upper limit of potential) or LiPF$_6$ (at 4.8V in upper limit of potential) in a mixture solvent of ethylene carbonate and dimethyl carbonate (FIGS. 6 and 7). When the upper limit of charge potential was 4.3V, the Fe-doped sample showed an abrupt change in slope of initial charge characteristic curve at 4V or higher compared with the Fe-undoped sample, and exhibited an increase in initial charge capacity. The capacity increased with an increase of iron content. In discharging, the Fe-doped sample showed a flat potential portion in the region of 4V which portion was not found in the Fe-undoped sample of layered rock salt-type manganese oxide. It was confirmed that the capacity increased with an increase of iron content.

The Fe-doped $Li_{2-x}MnO_{3-y}$ of the invention was confirmed to be capable of charging unlike Fe-undoped samples and can be suitably used as a cathode material for lithium ion secondary batteries.

EXAMPLE 6

To ascertain the change in valence of manganese in charging and discharging, X-ray absorption spectrum measurement in MnK-absorption edge was made of 30% Fe-doped sample, which was prepared in Example 2, after charging to 4.3V and the same samples after discharging to 2.5V (FIG. 5). No significant energy shift was found which suggested that the valence state of Mn was kept at 4 after charging to 4.3 V and after discharging to 2.5V.

$^{57}$Fe Mössbauer spectroscopies were conducted for 10% Fe-doped sample, which was prepared in Example 3, after charging to 4.3V and after discharging to 2.5V (FIG. 3). The spectrum shape after charging made a great change compared with the shape before charging. The spectra were fitted by superposition of the singlets over the doublets. The IS value of the singlet component is about +0.01 mm/s as shown in Table 2, and is close to the reported value of tetravalent iron in $SrFeO_{2.97}$ and $Na_{0.5}FeO_2$ (Y. Takeda, K. Nakahara, M. Nishijima, N. Imanishi, O. Yamamoto, M. Takano and R. Kanno, Mat. Res. Bull., 29, [6] 659, (1994) and Y. Takeda, R. Kanno, T. Takada, O. Yamamoto, M. Takano, N. Nakayama and Y. Bando, J. Solid State Chem., 63, 237, (1986)). It is presumed that the iron in the sample has been oxidized from $Fe^{3+}$ to $Fe^{4+}$.

On the other hand, the IS value of the doublet component was intermediate between the reported value of tetravalent iron and the value of high-spin trivalent iron. It was suggested that a part of the iron in the sample was tetravalent.

From the spectrum for the sample after discharging to 2.5V subsequent to charging to 4.3V, it is clear that the area ratio of the singlet component pronouncedly decreased, while the IS value of the doublet component as the main component recovered to the level similar to that of high-spin trivalent iron. This indicates that after discharging, the iron returned practically to trivalent. A similar tendency is found in 30% Fe-doped sample (FIG. 4). The singlet component which belongs to tetravalet iron having an IS value of −0.15 mm/s after charging was found but the area ratio of this component dropped to 10% or less after discharging. This shows that the flat portions of charging and discharging curves at about 4V in a lithium battery using Fe-doped $Li_{2-x}MnO_{3-y}$ as the cathode mainly corresponds to $Fe^{3+}/Fe^{4+}$ redox. It is evident that although it has been difficult for lithium ferrite ($LiFeO_2$) to charge and discharge at 4V or above, the charge and discharge characteristics of lithium ferrite ($LiFeO_2$) can be significantly improved by providing the compound with the crystal structure shown in FIG. 1.

Figure 8:
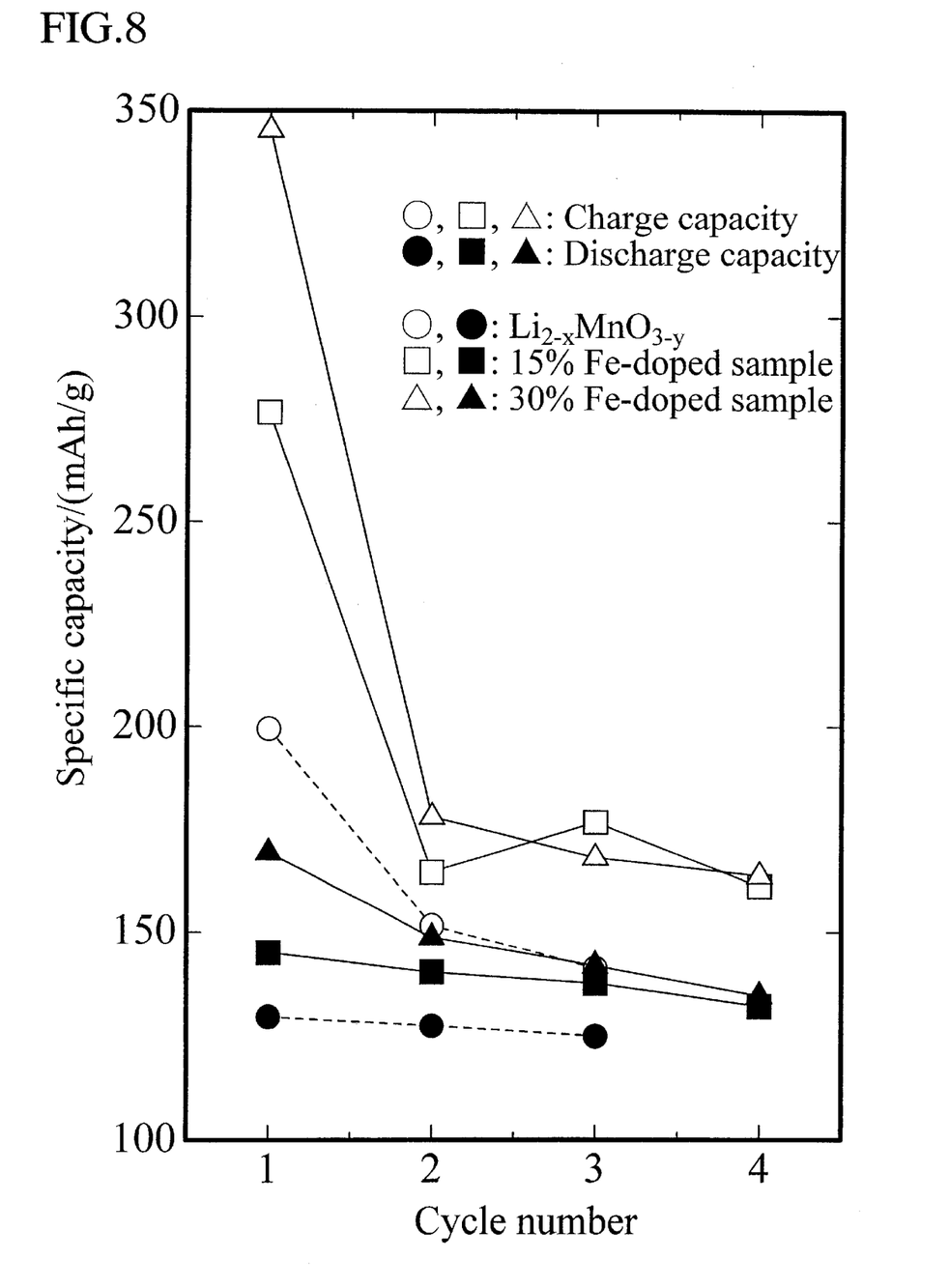
FIG. 8 shows the dependence of cycle number for charge and discharge characteristics of a coin-type lithium battery produced using an Fe-undoped, or 15% or 30% Fe-doped $Li_{2-x}MnO_{3-y}$ as the cathode and Li metal as the anode.

The Fe-doped sample of the invention was improved in initial charge capacity and in discharge capacity under the charging and discharging conditions including an upper limit of potential elevated to 4.8V, compared with $Li_{2-x}MnO_{3-y}$ (FIG. 7). When 30% Fe-doped sample was chemically analyzed after charging to 4.8 V (Table 1), the data show that Li ions were removed from the sample by about 1.7 as calculated based on the formula. This value is very close to the amount (1.5) of removed Li, calculated based on the initial charge capacity. This ascertained that the extraction of Li ions occurred in charging. That the Fe-doped sample has a higher capacity is apparent also from the dependence of cycle number for charge and discharge capacities as shown in FIG. 8.

It is confirmed that when iron participates in charging and discharging, the lithium ferrite based oxide prepared according to the invention is desirable in terms of both reduced costs and improved performance compared with the Fe-undoped samples.

What is claimed is:

1. A single-phase lithium ferrite based oxide having a layered rock salt structure, the oxide comprising Fe-doped $Li_{2-x}MO_{3-y}$ solid solution wherein M is at least one species selected from the group consisting of Mn, Ti and Sn, $0 \leq x < 2$, $0 \leq y \leq 1$, and wherein a molar ratio of iron/(iron+M) in said solid solution is $0.21 \leq Fe/(Fe+M) \leq 0.75$.

2. A cathode material for a lithium ion secondary battery, the material comprising a single-phase lithium ferrite based oxide having a layered rock salt structure, the oxide comprising Fe-doped $Li_{2-x}MO_{3-y}$ solid solution wherein M is at least one species selected from the group consisting of Mn, Ti and Sn, $0 \leq x < 2$, $0 \leq y \leq 1$, and wherein the molar ratio of iron/(iron+M) in said solid solution is $0.15 \leq Fe/(Fe+M) \leq 0.75$.

3. A lithium ion secondary battery comprising the cathode material as defined in claim 2.

4. A process for preparing a single-phase lithium ferrite oxide having a layered rock salt structure, the oxide comprising Fe-doped $Li_{2-x}MO_{3-y}$ solid solution wherein M is at least one species selected from the group consisting of Mn, Ti and Sn, $0 \leq x < 2$, $0 \leq y \leq 1$ such that the molar ratio of iron/(iron+M) in said solid solution is $0.1 \leq Fe/(Fe+M) \leq 0.9$, the process comprising the steps of adding an aqueous solution of a lithium compound in a molar ratio (Li/Fe+M) of from 1 to 3 relative to the iron and M to a mixed aqueous or water-alcohol solution containing a water-soluble compound containing at least one species selected from the group consisting of Mn, Ti and Sn and a water-soluble iron compound to give a precipitate, and calcining the precipitate in an oxidizing atmosphere or in a reducing atmosphere.

5. The process according to claim 4, wherein the molar ratio of iron/(iron+M) in said solid solution is $0.2 \leq Fe/(Fe+M) \leq 0.75$.

6. A process for preparing a single-phase lithium ferrite oxide having a layered rock salt structure, the oxide comprising Fe-doped $Li_{2-x}MO_{3-y}$ solid solution wherein M is at least one species selected from the group consisting of Mn, Ti and Sn, $0 \leq x < 2$, $0 \leq y \leq 1$ such that the molar ratio of iron/(iron+M) in said solid solution is $0.1 \leq Fe/(Fe+M) \leq 0.9$, the process comprising the steps of adding a specified amount of lithium hydroxide to a solution comprising a water-soluble iron compound and a water-soluble compound containing at least one species selected from the group consisting of Mn, Ti, and Sn to give a precipitate, evaporating the solution and the precipitate to dryness to give a residue, and calcining the residue in an oxidizing atmosphere or in a reducing atmosphere.

7. The process according to claim 6, wherein the molar ratio of iron/(iron+M) in said solid solution is $0.2 \leq Fe/(Fe+M) \leq 0.75$.

* * * * *